(12) United States Patent
Kohira et al.

(10) Patent No.: US 6,749,508 B2
(45) Date of Patent: Jun. 15, 2004

(54) DISPLAY METHOD AND APPARATUS FOR DISPLAYING PROBABILITY CONTROLLED ORDERS OF DYNAMIC MOVEMENTS

(75) Inventors: Toshio Kohira, Osaka (JP); Tatsuya Shinkai, Suita (JP)

(73) Assignee: Konami Corporation, Tokyo (JP)

( * ) Notice: Subject to any disclaimer, the term of this patent is extended or adjusted under 35 U.S.C. 154(b) by 168 days.

(21) Appl. No.: 10/005,589

(22) Filed: Oct. 29, 2001

(65) Prior Publication Data

US 2002/0052236 A1 May 2, 2002

(30) Foreign Application Priority Data

Nov. 2, 2000 (JP) ......................... 2000-336595

(51) Int. Cl.[7] .................................. A63K 9/24
(52) U.S. Cl. ................. 463/31; 345/473; 345/474; 345/475
(58) Field of Search .................... 463/31; 345/473–475

(56) References Cited

U.S. PATENT DOCUMENTS

| 5,933,151 A | 8/1999 | Jayant et al. | |
| 5,947,823 A | 9/1999 | Nimura | |
| 5,983,190 A | 11/1999 | Trower, II et al. | |
| 6,141,019 A | * 10/2000 | Roseborough et al. | 345/473 |
| 6,388,665 B1 | * 5/2002 | Linnett et al. | 345/473 |

FOREIGN PATENT DOCUMENTS

JP          10-340092          12/1998

* cited by examiner

*Primary Examiner*—Jessica Harrison
*Assistant Examiner*—Corbett B Coburn
(74) *Attorney, Agent, or Firm*—Jordan and Hamburg LLP

(57) ABSTRACT

A character in a video game space is represented realistically and the demo screen is made enjoyable for a user. A start demo display processing unit 100 comprises a motion order assigning unit 101 which refers to any of a plurality of motion probability setting tables 111 based on the player selection in the player setting unit 122 and randomly assigns, based on the probability, the order of arrangement for the motions, a motion reproduction assigning unit 102 for assigning the reproduction of motion in this order to the image processing unit 11, and a motion interpolation assigning unit 103 for assigning to the image processing unit 11 the interpolation to the next motion close to completion of a motion. In the image processing unit 11, the motion image data 112 that have been stored are selectively referenced and processing for polygon drawing is conducted based on the assignment from the motion reproduction assigning unit 102 and the like, and a demo screen containing motions of the player which differ for each reproduction are displayed on the display device 2.

11 Claims, 17 Drawing Sheets

FIG. 12

MOTION PROBABILITY SETTING TABLE

| MOTION | START DEMO 1 APPEARANCE PROBABILITY | START DEMO 2 APPEARANCE PROBABILITY | START DEMO 3 APPEARANCE PROBABILITY | START DEMO 4 APPEARANCE PROBABILITY | NUMBER OF NECESSARY INTERPOLATION FRAMES |
|---|---|---|---|---|---|
| a | 80 | 10 | 1 | 20 | 5 |
| b | 10 | 30 | 2 | 25 | 3 |
| c | 6 | 40 | 3 | 25 | 3 |
| d | 4 | 20 | 94 | 30 | 2 |

DISPLAY METHOD AND APPARATUS FOR DISPLAYING PROBABILITY CONTROLLED ORDERS OF DYNAMIC MOVEMENTS

BACKGROUND OF THE INVENTION

1. Field of the Invention

The present invention relates to display control technology for displaying demo screen containing a character executing a prescribed motion.

2. Description of the Related Art

Video games are known in which a user is requested to operate a sport player as a character in a game space. In particular, in some of the known video games, a demo screen in which a player is set at a prescribed start line, while executing a motion, for example, swinging a part of his body, is driven just before the start of the game, thereby improving the presence effect of the user operating the player.

However, usually such demo screens do not change when a new game is played and the user becomes bored with one-pattern demo screens when several games are played.

SUMMARY OF THE INVENTION

In view of the above, it is an object of the present invention to provide a computer-readable recording medium storing a display control program capable of more realistic representation of a character in a game space and making the demo screen enjoyable for the user, and also to a display control method and apparatus.

The display control program recorded on the computer-readable recording medium in accordance with the present invention and designed to attain the above-described object conducts control so as to display a demo screen containing a character.

In the display control program, a correspondence is set between each of M dynamic images corresponding to different motions of the character and serving as portions of the demo screen and the probability relating to the appearance of the dynamic images, an order for arrangement of N dynamic images based on the probability is assigned, and N dynamic images are displayed according to the assigned order.

These and other objects, features and advantages of the present invention will become more apparent upon reading of the following detailed description along with the accompanied drawings.

BRIEF DESCRIPTION OF THE DRAWINGS

FIG. 12 illustrates an example of a motion probability setting table 111 (FIG. 11) relating to one player;

DETAILED DESCRIPTION OF INVENTION

A video game system which is a preferred embodiment of the present invention will be described below with reference to the drawings attached.

Figure 1:
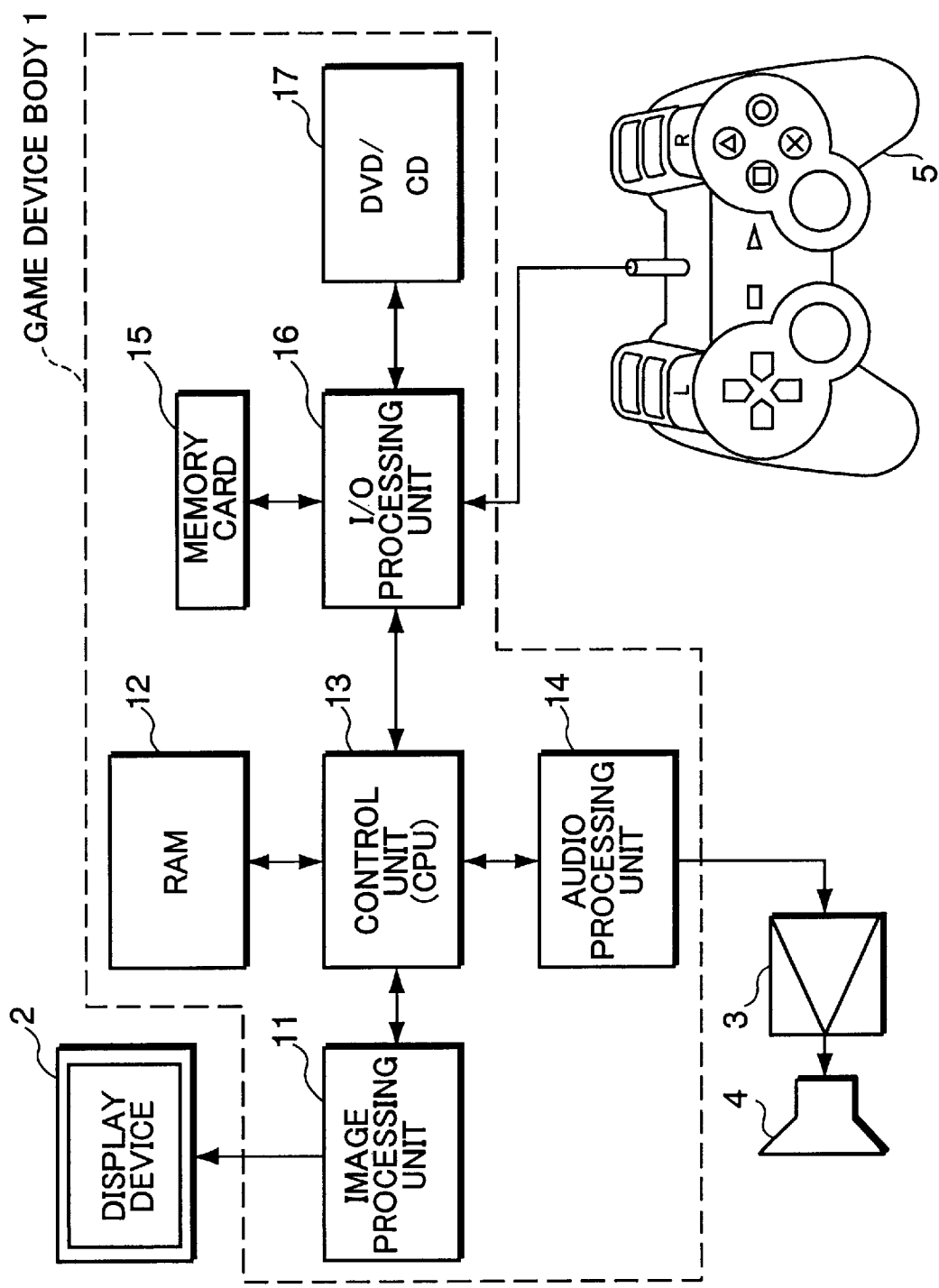
FIG. 1 illustrates the entire configuration of the video game system which is an embodiment of the present invention.

FIG. 1 illustrates an entire configuration of the video game system which is a preferred embodiment of the present invention.

The present video game system comprises a game device body 1 for conducting main control required for the user to play the video game, a display device 2 such as a CRT displaying images based on video signals from the game device body 1, an AV amplifier and speaker 4 for reproducing sound (including music; same hereinbelow) based on the audio signals from the game device body 1, and a controller 5 for the user to input control commands into the game device body 1.

More specifically, the game device body 1 comprises a DVD-ROM/CD-ROM drive 17 reading a program, image data, and audio data from a DVD-ROM or CD-ROM for a specific game, a RAM 12 temporarily storing the program read out from the DVD-ROM (or CD-ROM; same hereinbelow) and data used in the program, a control unit (CPU) 13 for controlling the entire course of the game based on the program on the RAM 12, a memory card 15 for retaining data (even after the interruption of power supply to the game device body 1) generated in the course of the game, and I/O processing unit 16 for reading data from the memory card 15 and writing them thereto, reading data from the DVD-ROM/CD-ROM drive 17, and processing the input from the controller 5, an image processing unit 11 for generating video signals form the image data read out from the DVD-ROM, while conducting image-specific processing such as polygon drawing, and an audio processing unit 14 provided with an ADPCM sound source and employed for generating audio signals from audio data read out from the DVD-ROM.

In particular, in the present video game system, a 3D motion video game simulating a snowboard competition is implemented by a program (stored on DVD-ROM) accompanied by start demo display processing described below with reference to FIGS. 11 to 17.

Figure 2:
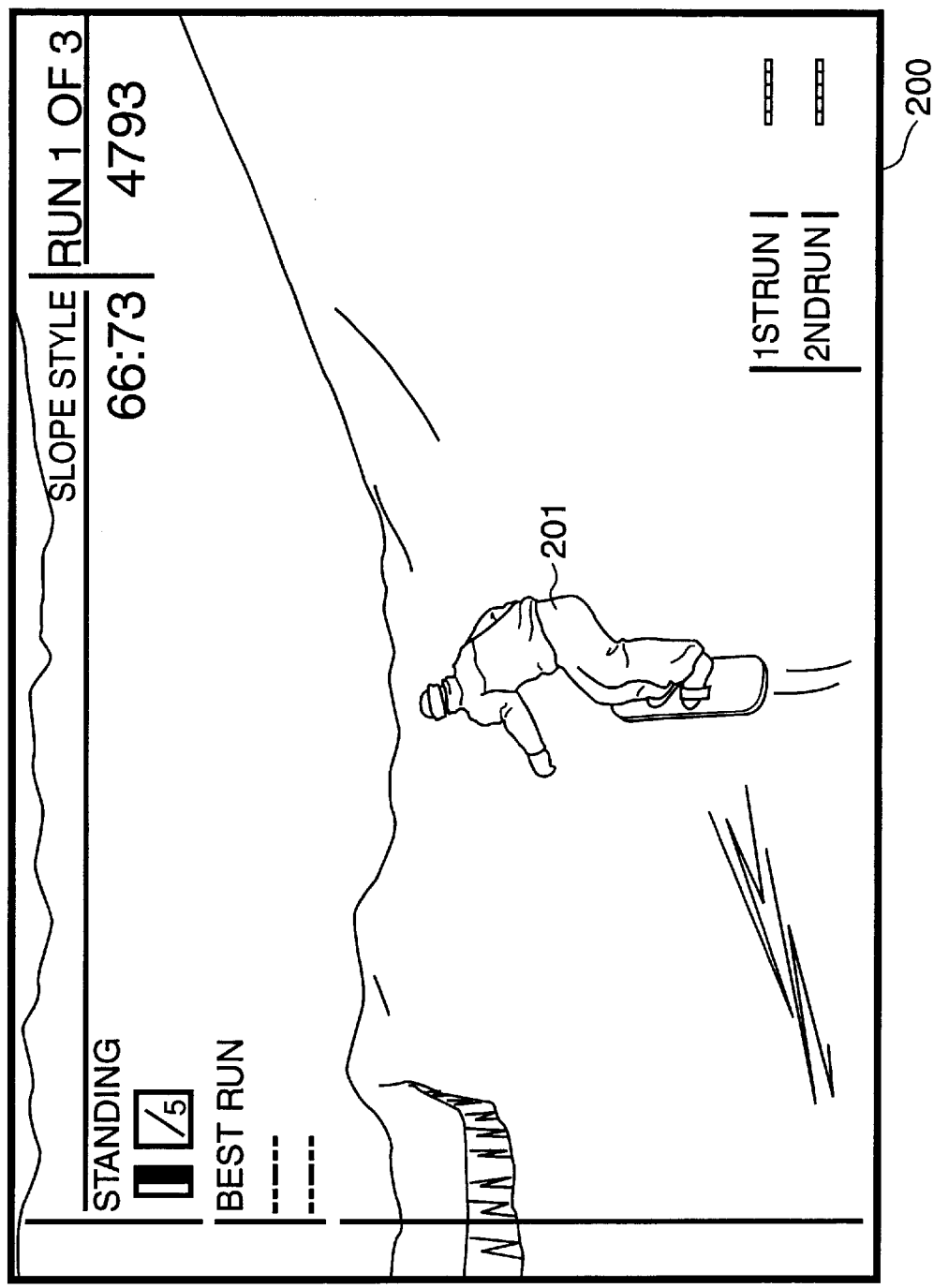
FIG. 2 illustrates an example of a display screen of the video game played in the present video game system.

FIG. 2 illustrates an example of a display screen of the video game implemented in the present video game system.

In the present video game, a character (player) 201 simulating a snowboarder sliding down the slope, which is projected from the rear side with a virtual camera, is displayed on the game screen 200, while being moved according to the input from the user via the controller 5, and the competition relates to the skills and speed of the snowboarder sliding down the slope.

Such video games simulating the snowboard competition are controlled by the following processing.

Figure 3:
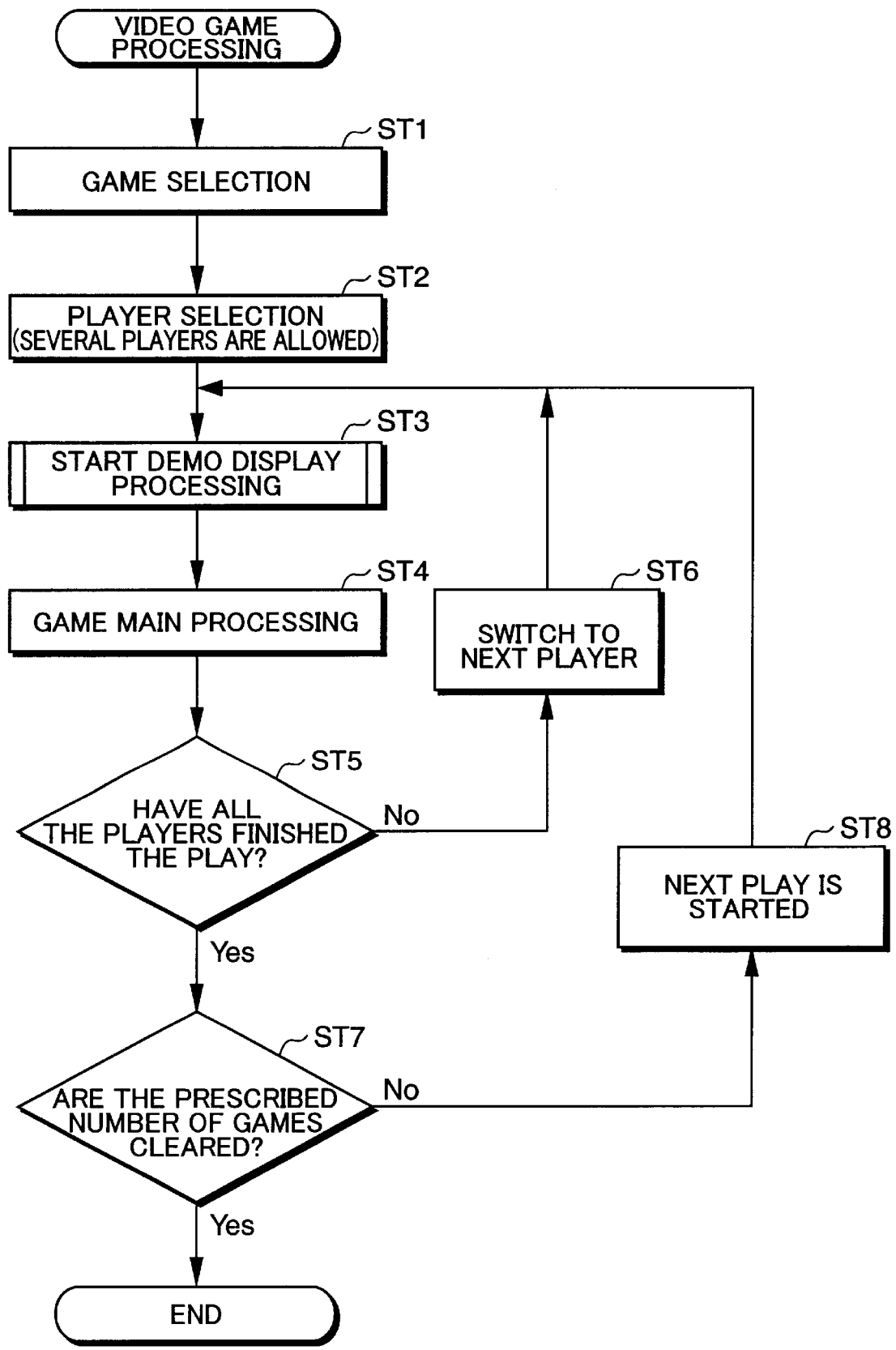
FIG. 3 is a flow chart illustrating the procedure of video game processing conducted in the present video game system.
Figure 4:
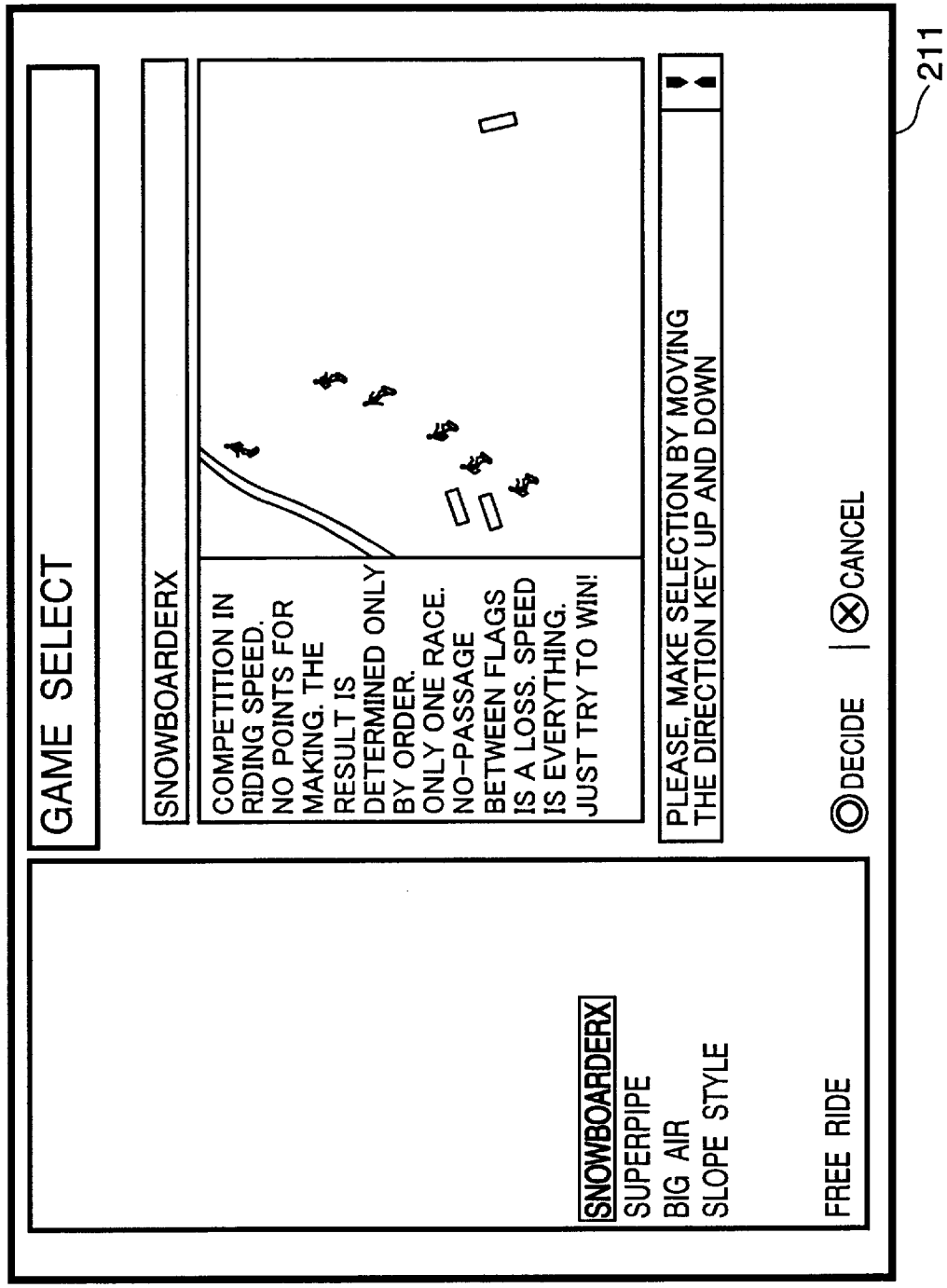
FIG. 4 is an example of a screen displayed when "SNOW-BOARDER X" is selected in the game selection in ST1 of video game processing shown in FIG. 3.
Figure 5:
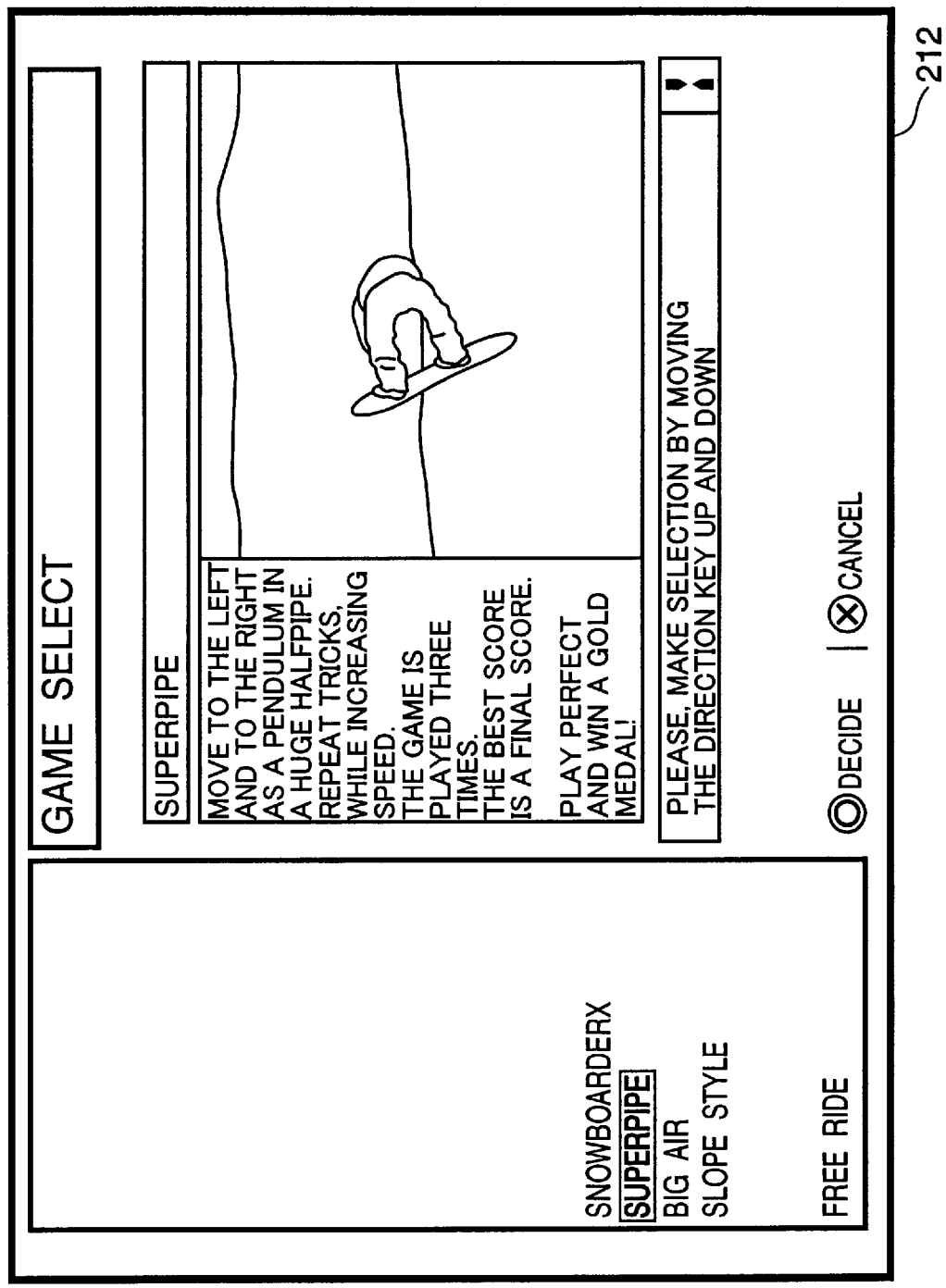
FIG. 5 illustrates an example of a screen displayed when "SUPERPIPE" is selected in the game selection in ST1 of video game processing shown in FIG. 3.
Figure 6:
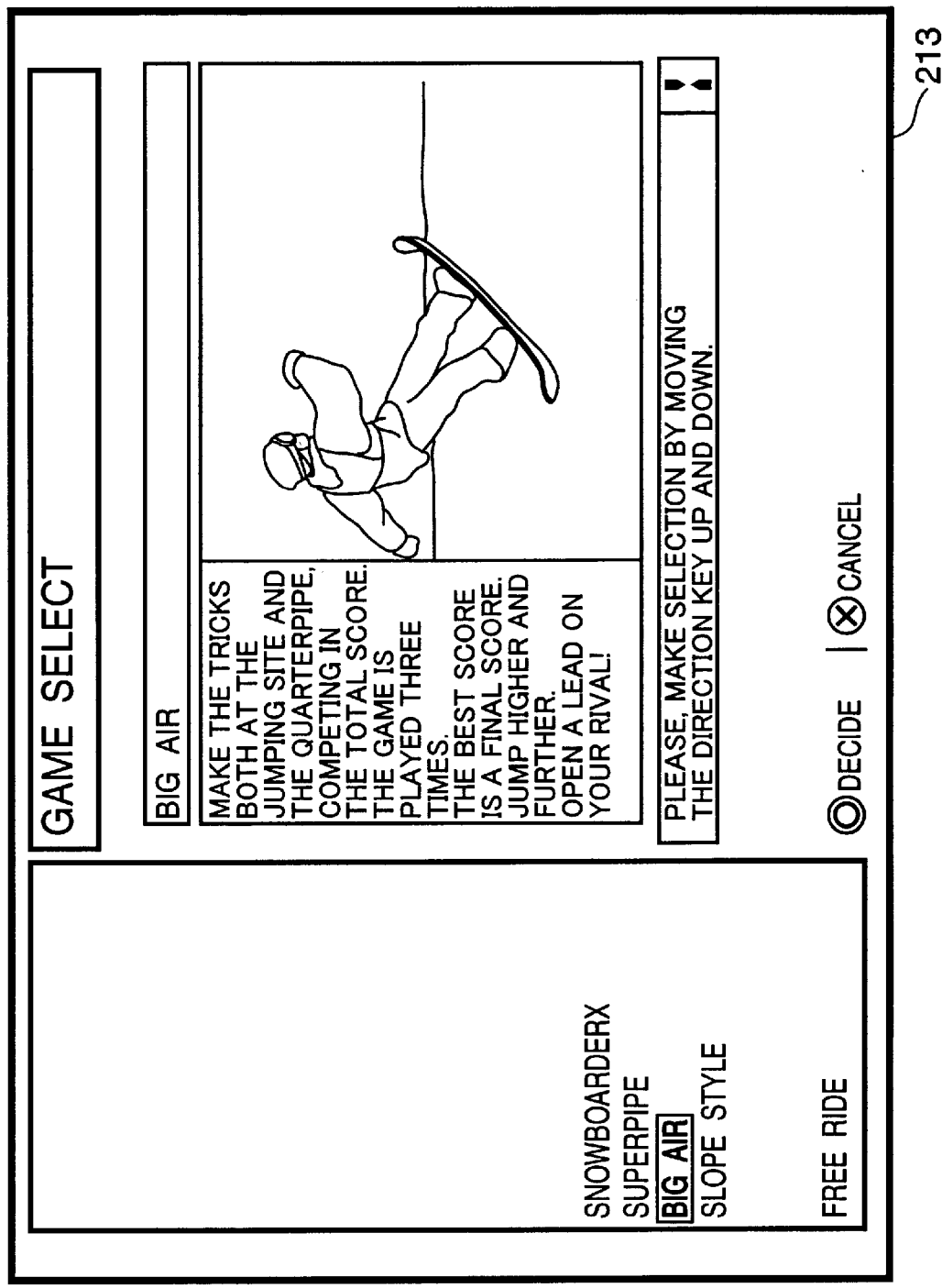
FIG. 6 illustrates an example of a screen displayed when "BIG AIR" is selected in the game selection in ST1 of video game processing shown in FIG. 3.
Figure 7:
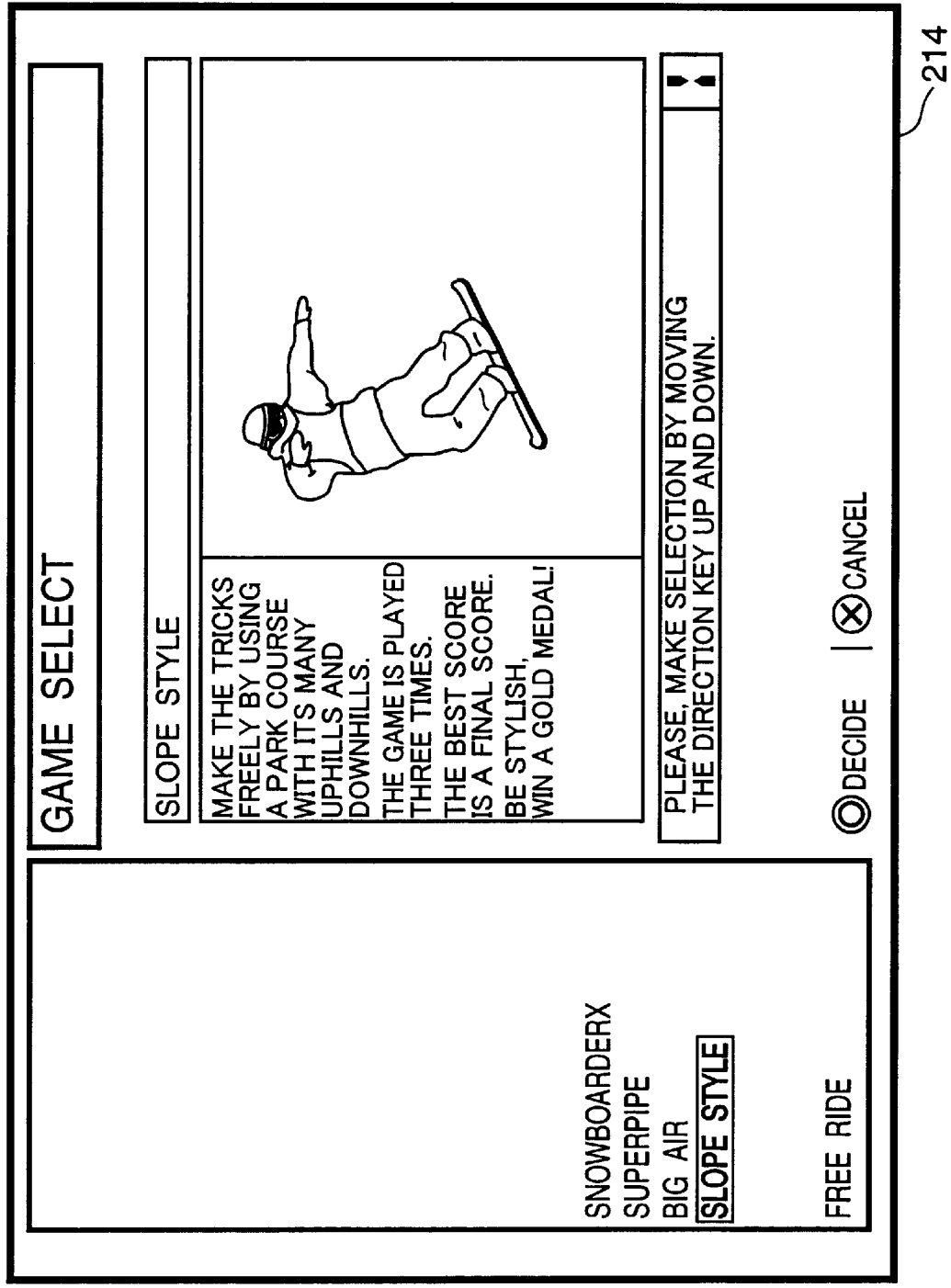
FIG. 7 illustrates an example of a screen displayed when "SLOPE STYLE" is selected in the game selection in ST1 of video game processing shown in FIG. 3.
Figure 8:
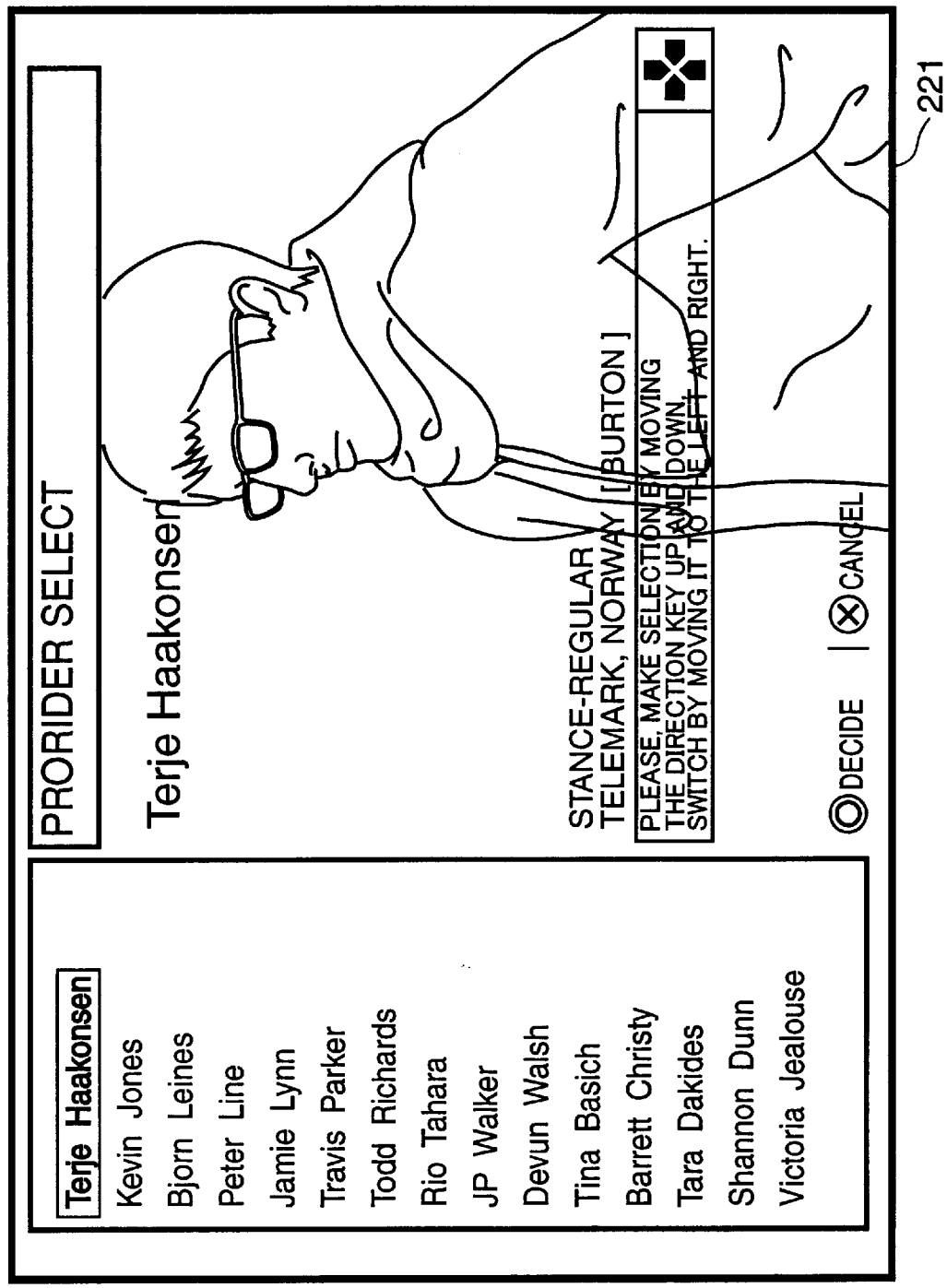
FIG. 8 illustrates an example of a screen displayed when "Terje Haakonsen" is selected in the player ("PRORIDER") selection in ST2 of video game processing shown in FIG. 3.
Figure 9:
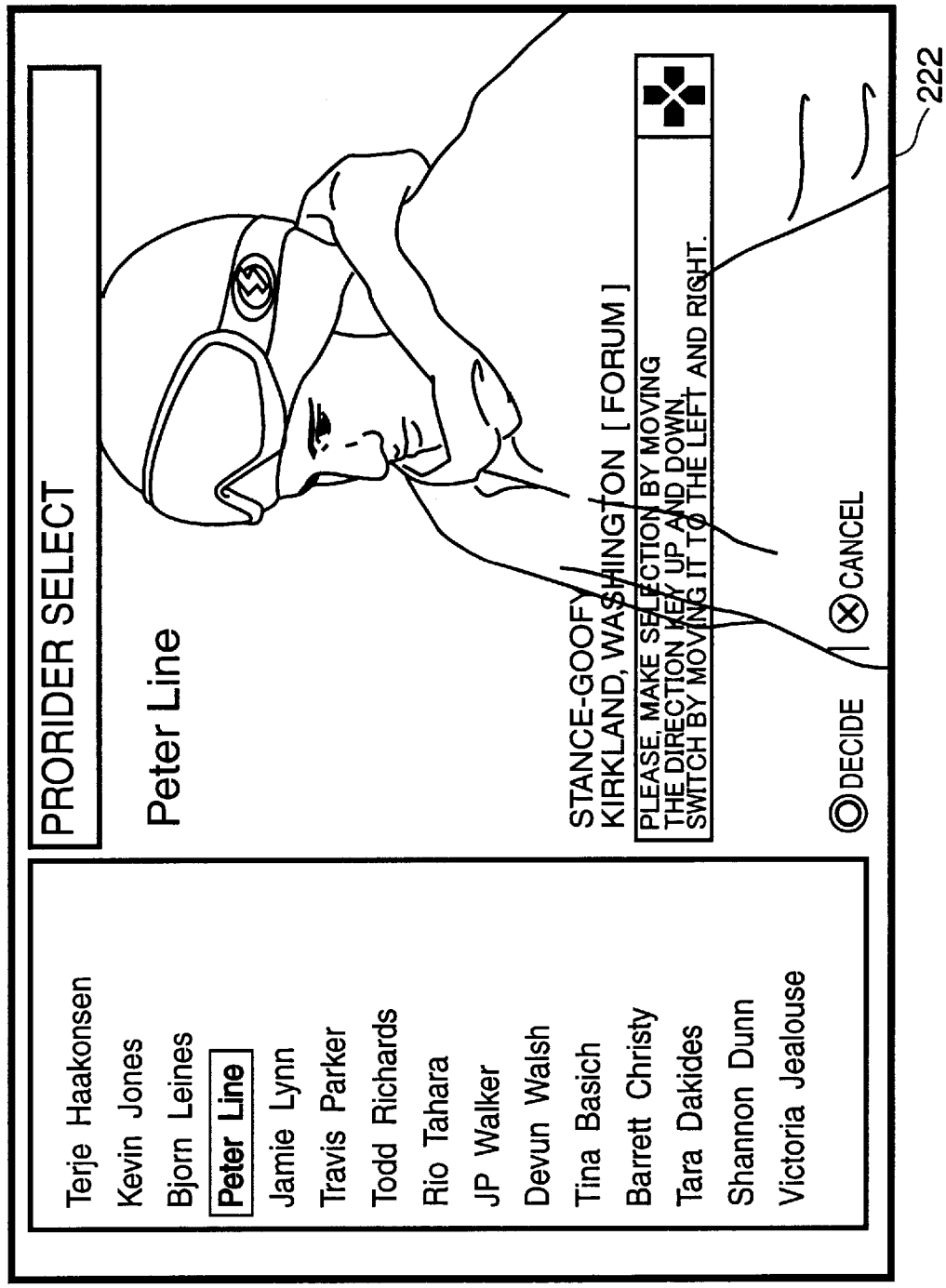
FIG. 9 illustrates an example of a screen displayed when "Peter Lin" is selected in the player selection in ST2 of video game processing shown in FIG. 3.
Figure 10:
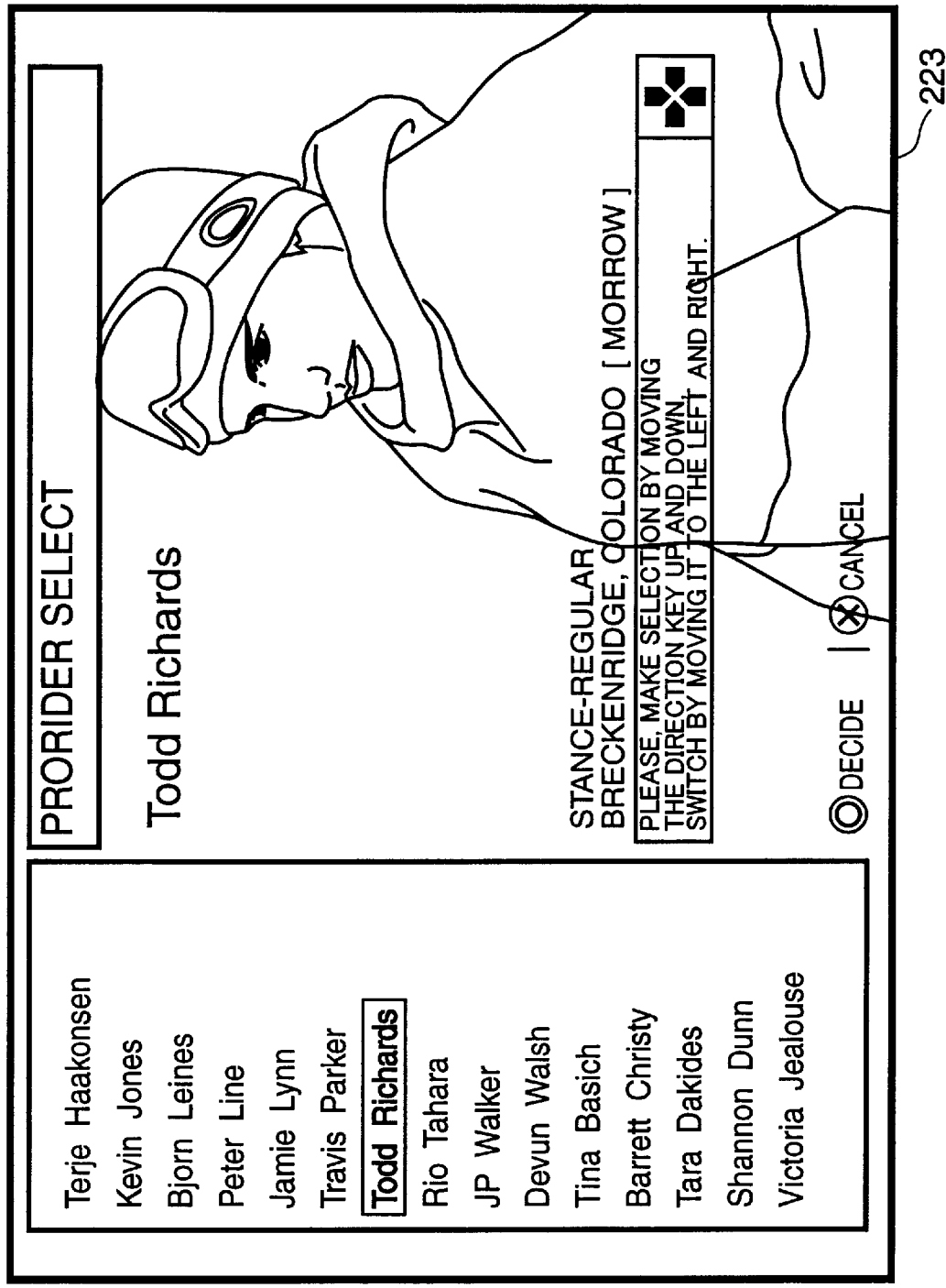
FIG. 10 illustrates an example of a screen displayed when "Todd Richards" is selected in the player selection in ST2 of video game processing shown in FIG. 3.

FIG. 3 is a flow chart illustrating the procedure of video game processing conducted in the present video game system. FIGS. 4 to 7 illustrate the examples of screens displayed in game selection in ST1 of video game processing shown in FIG. 3. FIGS. 8 to 10 illustrate the examples of screens displayed in player selection in ST2 of the video game processing.

In the present video game processing, first, the snowboard game is selected (ST1) and a player is selected (ST2) by the user. As for the player selection, a system can be used in which one player corresponds to one user or a plurality of players are successively operated by a plurality of users.

In each of the game selection screens 211~214 shown in FIGS. 4 to 7, the snowboard game executed in subsequent game main processing can be set to "SNOWBOARDER X", "SUPERPIPE", "BIG AIR", "SLOPE STYLE" (the above-described display screen 200 shown in FIG. 2 relates to a "SLOPE STYLE" game) by pushing the "O" button disposed on the controller 5 and selecting "DECIDE". Furthermore, in each of the player selection screens 221~223 shown in FIGS. 8 to 10, the snowboarder operated by the user in the subsequent game main processing can be set to "Terje Haakonsen", "Peter Line", or "Todd Richards" by pushing the "O" button disposed on the controller 5 and selecting "DECIDE".

Then, a start demo display processing is conducted (ST3 in FIG. 3, described below in greater details with reference to FIGS. 11 to 17), and game main processing by the user is executed (ST4). If one game played by one player is completed, a decision is made of whether the games played by all players have been completed (ST5).

When a plurality of users play, if the games of all players have not been completed (No in ST5), setting is made so as to switch to the next player (ST6), and processing is repeated from ST3. If the games of all players have been completed (Yes in ST5), a decision is made of whether the prescribed number of games have been cleared (in some games, several plays are set for one player) (ST7).

If the prescribed number of games have been cleared (YES in ST7), the present vide game processing is completed, and if the prescribed number of games have not been cleared (No in ST7), the next play is started anew (or when several users play, the setting is made so as to change to the initial player) (ST8), and the processing is repeated from ST3.

Figure 11:
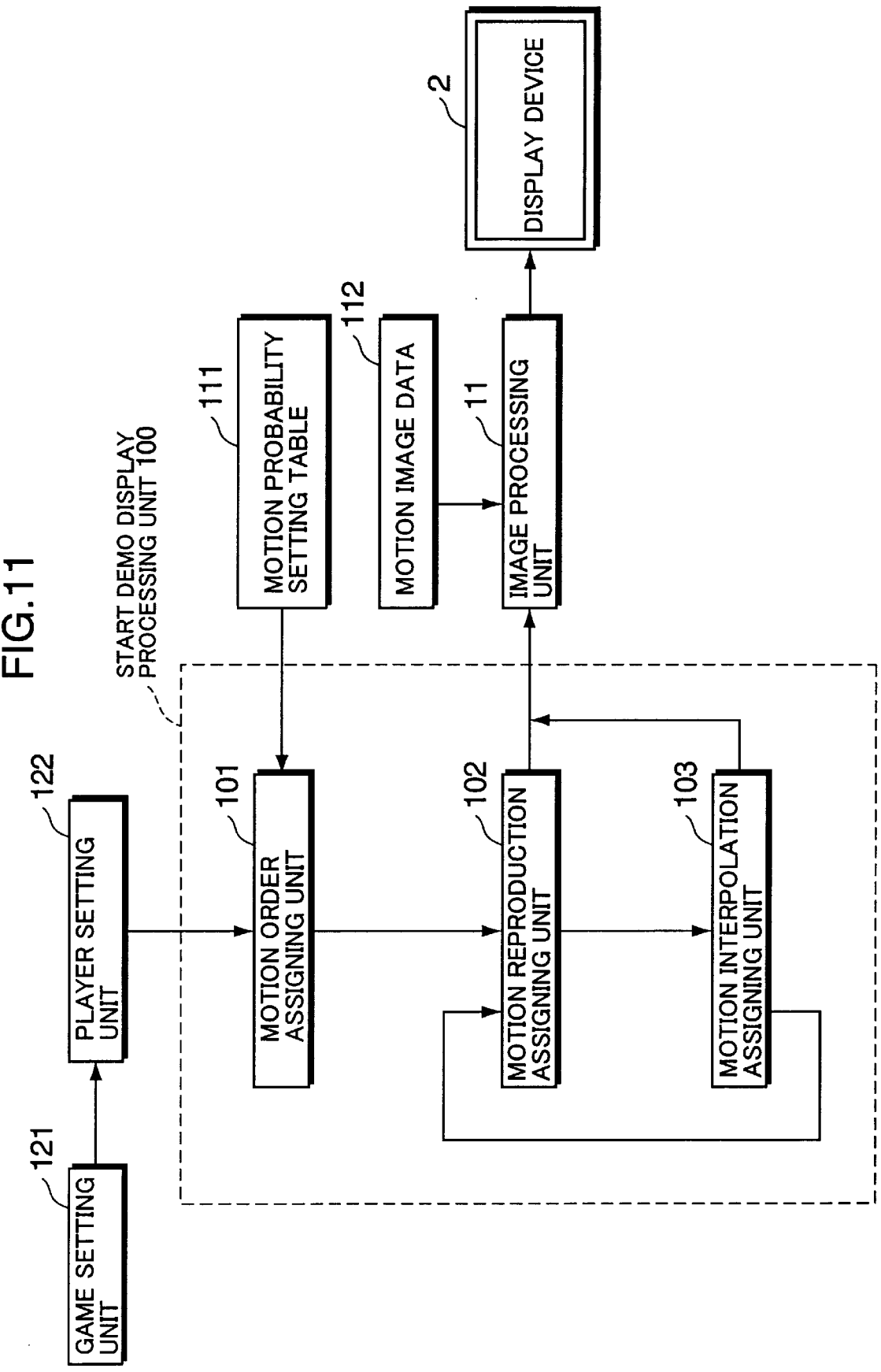
FIG. 11 is a block diagram illustrating the main components constituting the start demo processing unit 100.

The start demo display processing in accordance with the present invention which is conducted in the above-described video game processing will be described below. FIG. 11 is a block diagram illustrating the main components constituting the start demo display processing unit (program executing the start demo display processing) 100.

The start demo display processing unit 100 comprises a motion order assigning unit 101 for randomly assigning, based on the probability, the order of arrangement for motions contained in a start demo preceding a certain game, while referring to any of a plurality motion probability setting tables 111 (described below with reference to FIG. 12), those tables corresponding to a plurality of players, based on the selection of a game in the game setting unit 121 and selection of a player in the player setting unit 122, a motion reproduction assigning unit 102 for assigning the reproduction of motion in the assigned order to the image processing unit 11, and a motion interpolation assigning unit 103 for assigning interpolation to the image processing unit 11 so as to interpolate a motion to the next following motion if the motion completion is approached. In the image processing unit 11, motion image data 112 that have been stored in advance are selectively referenced and processing for polygon drawing is conducted based on the assignment from the motion reproduction assigning unit 102 or motion interpolation assigning unit 103, and a demo screen containing motions of the player which differ for each reproduction is displayed on the display device 2.

The motion probability setting table 111 is set in the following manner.

FIG. 12 illustrates an example of a motion probability setting table 111 (corresponds to one person). FIGS. 13~16 illustrate examples of motions (a)~(d) in the motion probability setting table 111.

One motion probability setting table 111 is set for one player, and mutually different motion probability setting tables are set for a plurality of players. A correspondence can be established between the start demo 1~4 in the motion probability setting table 111 and each of the games such as "SNOWBOARDER X", "SUPERPIPE", "BIG AIR", and "SLOPE STYLE".

Figure 13:
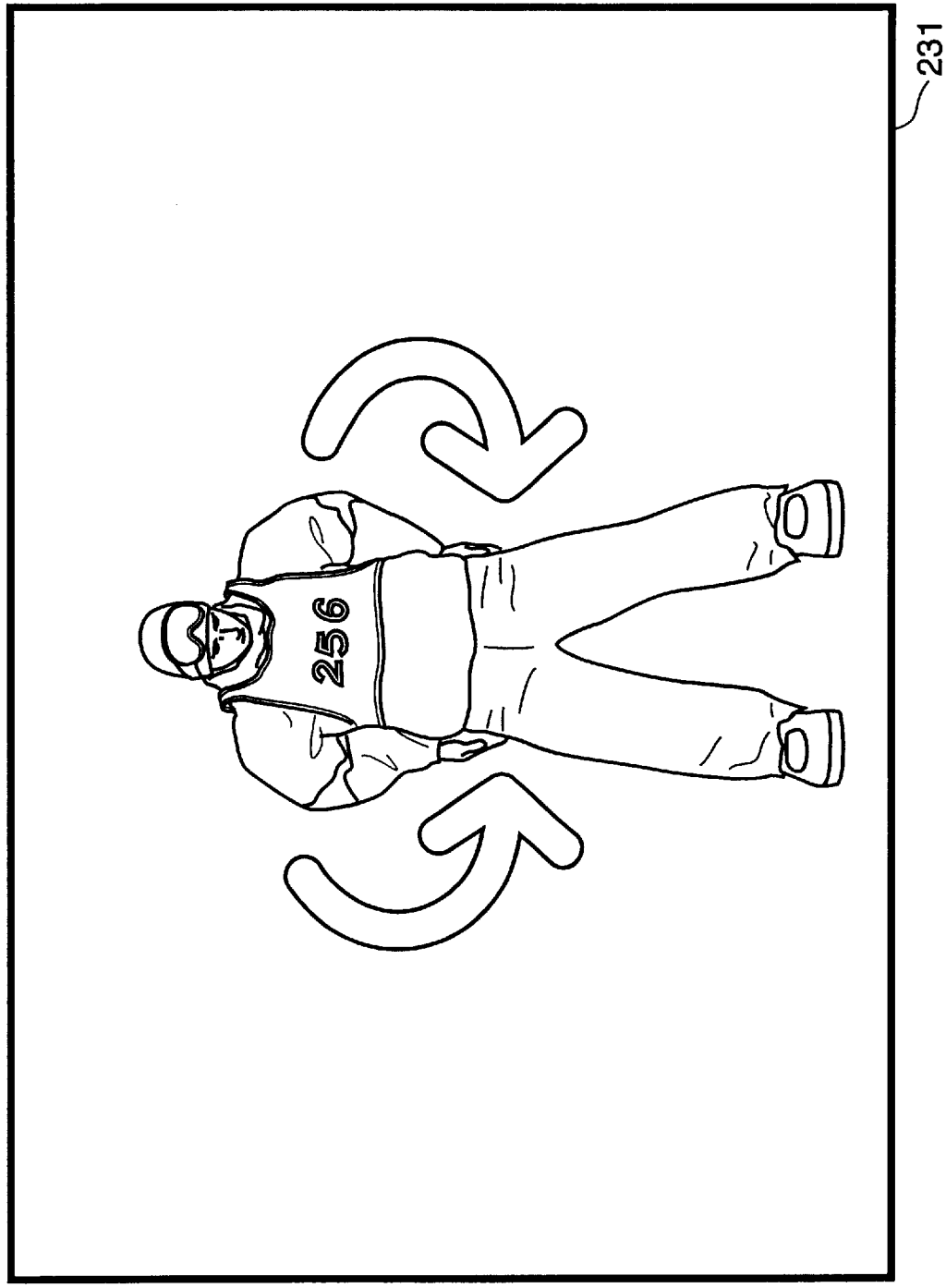
FIG. 13 illustrates an example of motion (a) (motion of slapping the lower part of the body)
Figure 14:
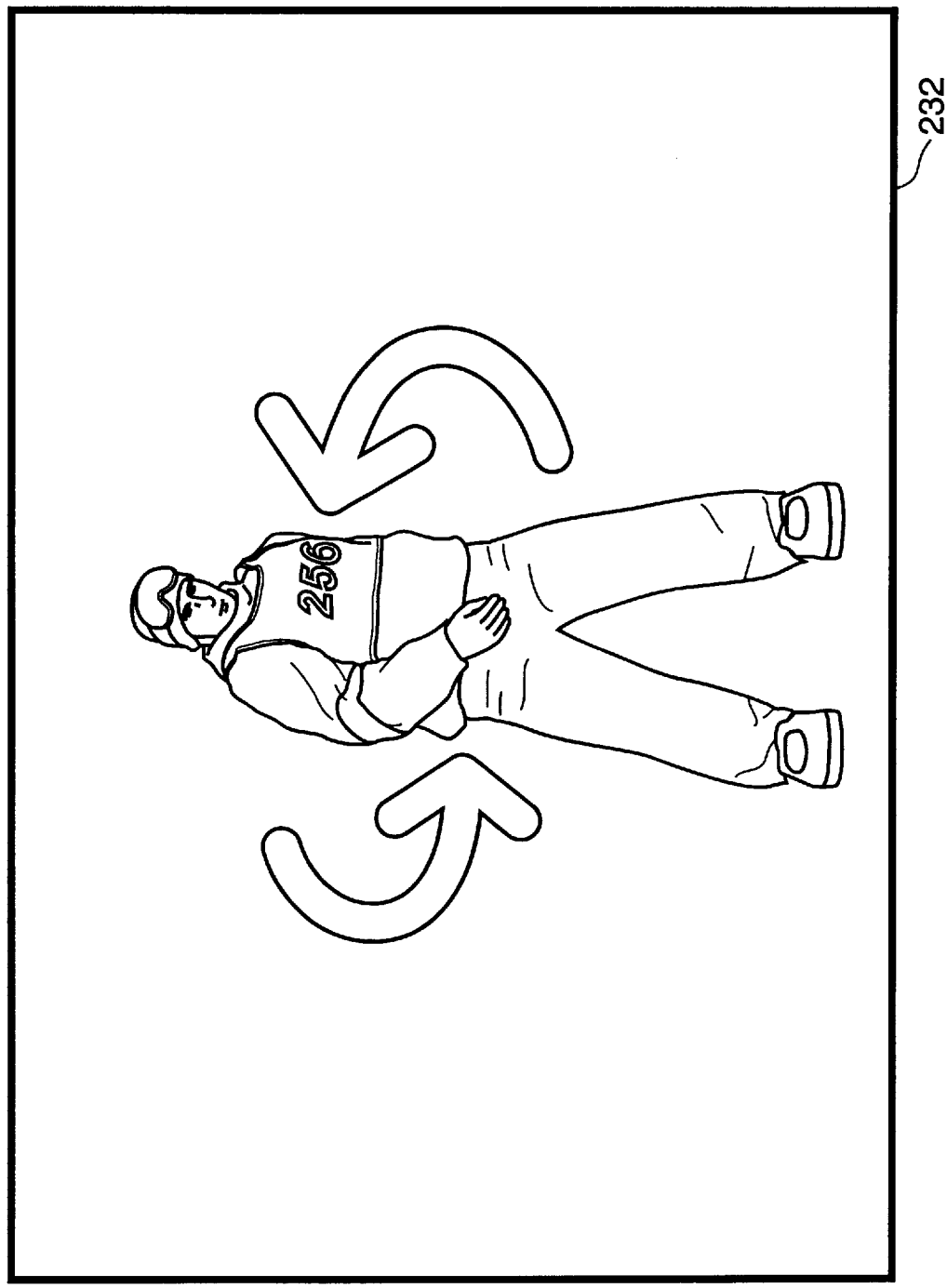
FIG. 14 illustrates an example of motion (b) (motion of rotating the upper part of the body to the left)
Figure 15:
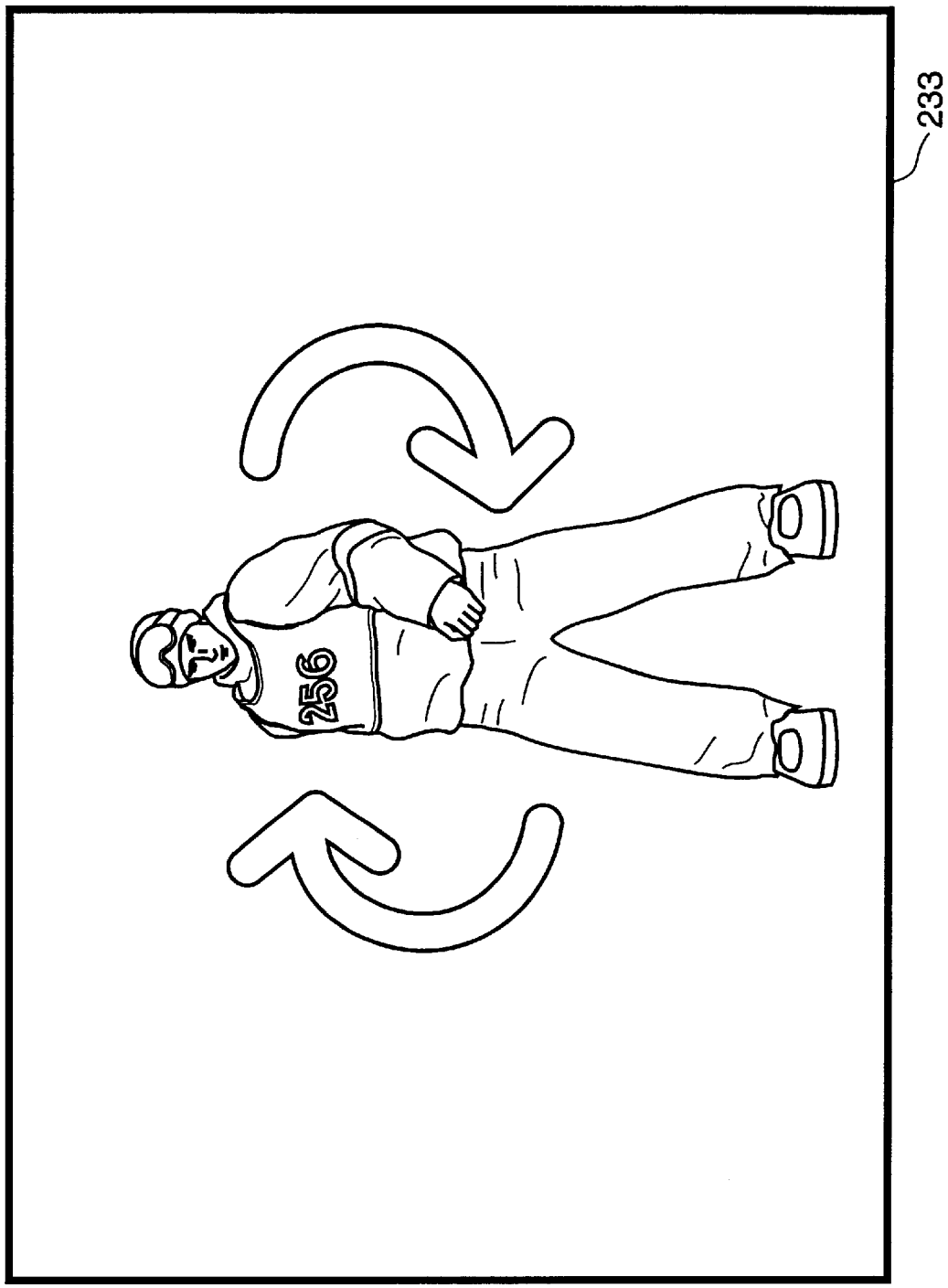
FIG. 15 illustrates an example of motion (c) (motion of rotating the upper part of the body to the right)
Figure 16:
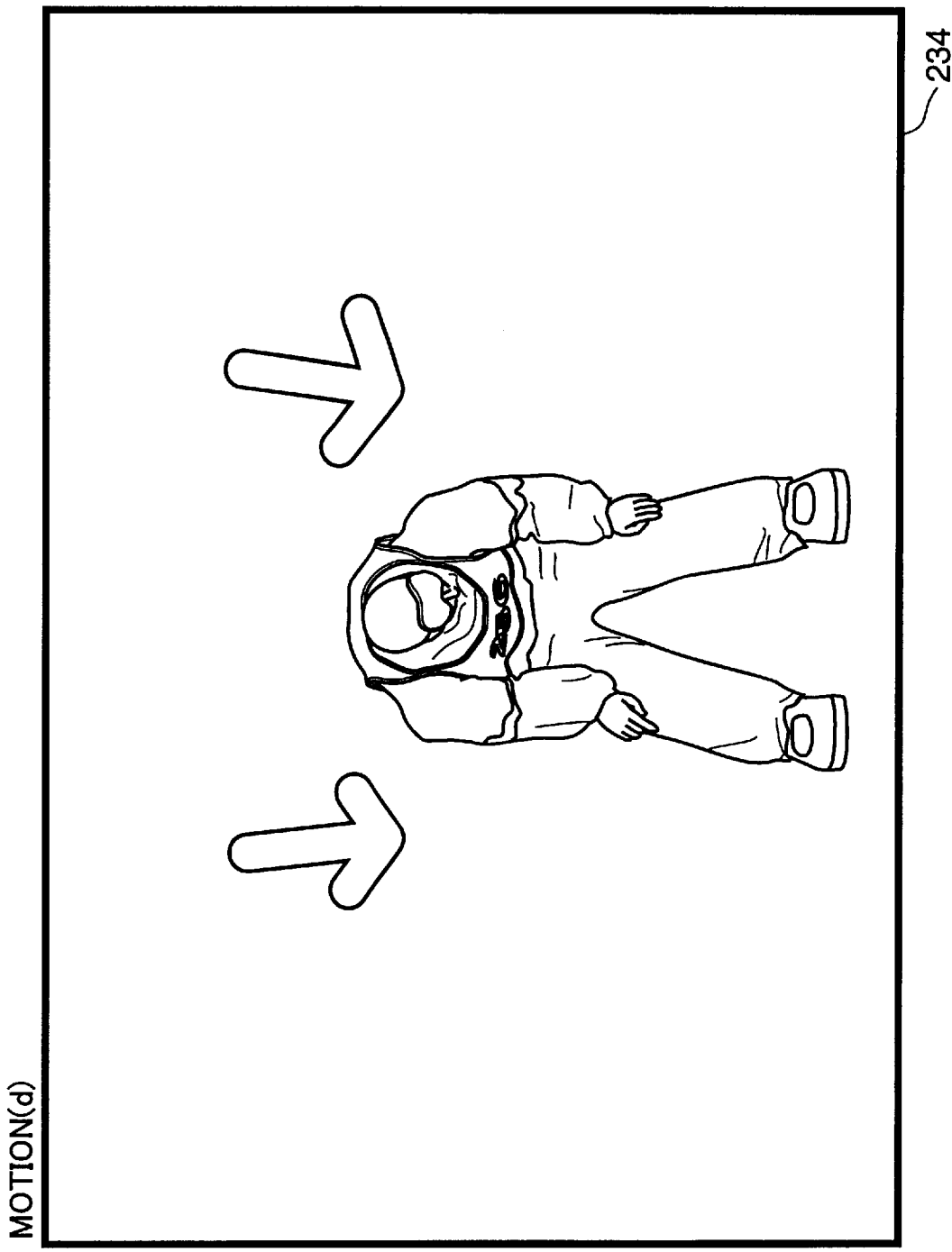
FIG. 16 illustrates an example of motion (d) (motion of bending the upper part of the body downward)

Furthermore, a correspondence is established between each of motions (a)~(d) in the motion probability setting table 111 and one motion of the player, and a motion of slapping the lower part of the body, as shown in FIG. 13, can be set as motion (a) image 231, a motion of rotating the upper part of the body to the left, as shown in FIG. 14, can be set as motion (b) image 232, a motion of rotating the upper part of the body to the right, as shown in FIG. 15, can be set as motion (c) image 233, and a motion of bending the upper part of the body downward, as shown in FIG. 16, can be set as motion (d) image 234.

Numerical values in the motion probability setting table indicate the probability of (appearing) motion which is to be reproduced in the first order; the motion that has been reproduced once is not reproduced again. As for the order of motions which are to be reproduced after the first motion, the motions are randomly assigned based on the probability corresponding to the ratio of numerical values in the motion probability setting table from the motions from which the motions with an already specified order have been excluded.

Assuming that three motions among the four motions (a)~(d) indicated in the motion probability setting table shown in FIG. 12 are reproduced during one start demo display, the numerical values presented in the motion probability table are used in the following manner and the order of reproduction of the (three) motions is assigned.

For example, when a start demo 1 is displayed, the motion which is to be reproduced in the first order is randomly set based on the values of 80, 10, 6, 4 of probability in the motion probability setting table. If the motion (a) with the highest probability is set as the motion which is to be reproduced in the first order, then the motion which is to be reproduced in the second order is randomly set based on the probability corresponding to the ratio of values 10, 6, 4.

The probability of assigning motion (b) as the motion which is to be reproduced in the second order is 10/(10+6+4); the respective probabilities for motions (c) and (d) are 6/(10+6+4) and 4/(10+6+4). If motion (b) with the highest probability is set as the motion which is to be reproduced in the second order, then the motion which is to be reproduced in the third order is randomly set based on the probability corresponding to the ratio of values 6, 4, in the same manner as described above.

In addition, the number of necessary interpolation frames is set in the motion probability setting table and the number of frames necessary for interpolation when a motion is linked to the next motion.

Figure 17:
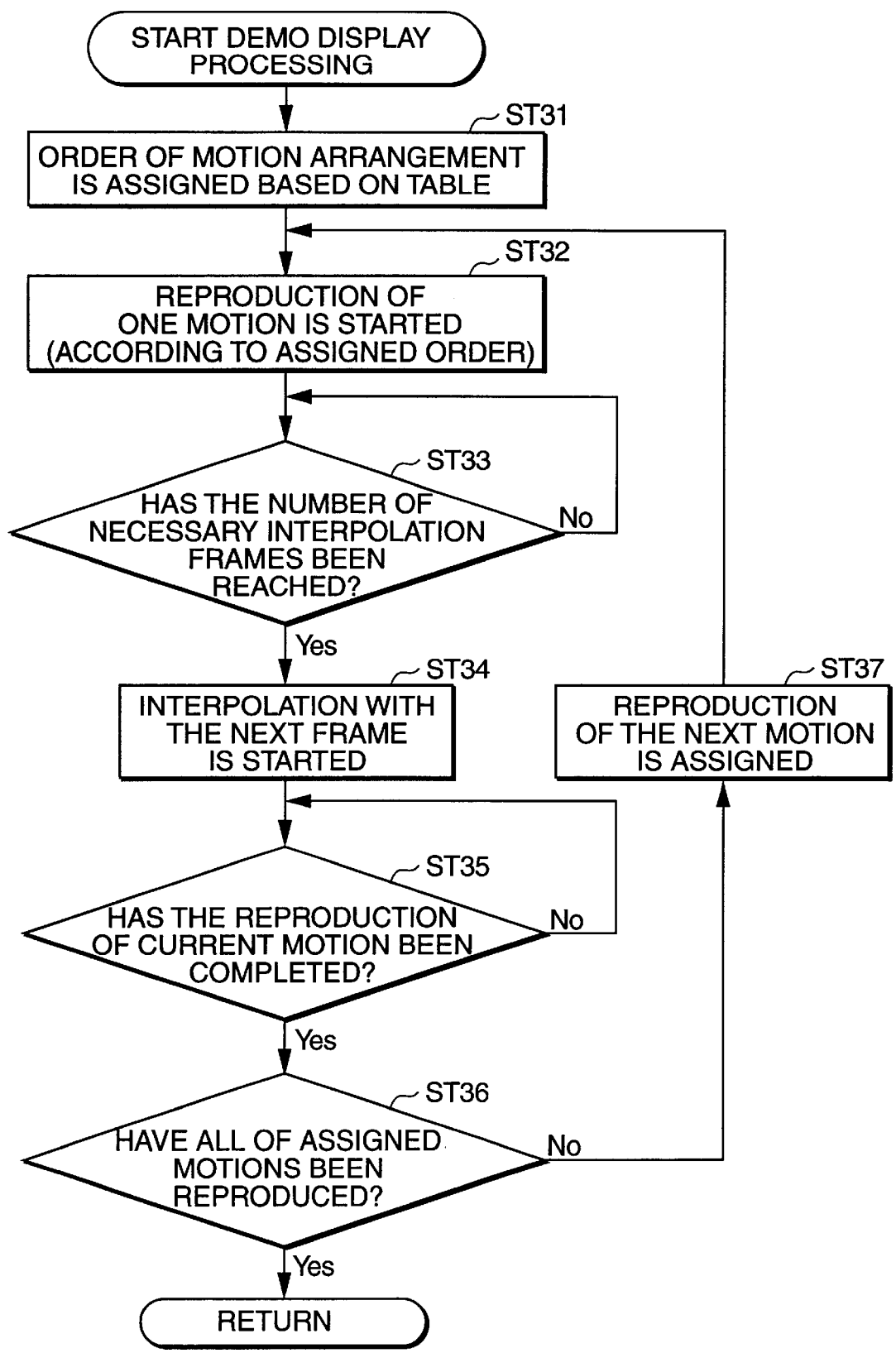
FIG. 17 is a flow chart illustrating the procedure of start demo display processing (conducted as processing in ST3 of video game processing shown in FIG. 3) specifically relating to the present invention.

FIG. 17 is a flow chart illustrating the procedure of start demo display processing (conducted as processing in ST3 of video game processing shown in FIG. 3).

In the start demo display processing, the motion probability setting table 111 is used in the above-described manner by the motion order assigning unit 101 (FIG. 11), the order of motion arrangement is assigned (ST31), and a start of reproduction of one motion is assigned (ST32) from the motion reproduction assigning unit 102 to the image processing unit 11 according to the assigned order.

In the motion interpolation assigning unit 103, if a decision is made that the number of frames required for interpolation has been reached close to the completion of one motion (Yes in ST33), then interpolation with subsequent motion is started (ST34), and if a decision is made that the reproduction of the current motion has been completed (Yes in ST35), then a decision is made that all of the motions that have been assigned have been reproduced (ST36).

If all of the assigned motions have not been reproduced (No in ST36), the next motion is assigned to be reproduced (ST37) and processing from ST32 is repeated; if all of the assigned motions have been reproduced (YES in ST36), the present start demo display processing is returned.

With the above-described start demo display processing of the video game system, the order of motions in one start demo is randomly assigned based on the numerical numbers in a motion probability setting table. Therefore, the motions are reproduced in an order which differs each time the demo screen is reproduced, motions of the player seem to be intentional, the player is represented in a more realistic manner, and the demo screen is made enjoyable for the user.

In this start demo display processing, the numerical values in the motion probability setting table are the probabilities of motion reproduction in the first order, and the probability during determining the order of motions which are to be reproduced in the second and subsequent orders is set according to the ratio of those numerical values. As s result, the order of motions in the start demo can be assigned readily and without overlapping and a more natural motion can be displayed.

In such start demo display processing, because the above-described probability is made different depending on a game type (in one motion probability setting table) or the above-described probability is made different depending on a player (by using a plurality of motion probability setting tables), a certain player can be characterized by increasing or decreasing the frequency of demonstrating a specific behavior in a start demo during a certain game, stereotyping of demo can be prevented by endowing the player with individual features, and the game which follows the start demo is made more enjoyable for the user.

Furthermore, in the start demo display processing in the video game system of the above-described embodiment, an assumption was made that three motion images of the four motion images that have been stored in advance are arranged, by using probabilities, so as to prevent overlapping. However, any N motion images of any M motion images can be arranged with a motion probability setting table similar to the above-described table.

Summing up the aforementioned descriptions, the present invention relates to a computer-readable recording medium storing a display control program which controls a demo screen including a character, said display control program comprising the steps of: setting a correspondence between each of M dynamic images corresponding to mutually different motions of the character and serving as portions of the demo screen and the probability relating to the appearance of the dynamic images; assigning an order for arrangement of N dynamic images based on said probability; and displaying said N dynamic images according to the assigned order.

The present invention relates also to a display control device conducting control so as to display a demo screen including a character. The display control device comprises memory means for storing a correspondence between each of M dynamic images corresponding to mutually different motions of the character and serving as portions of the demo screen and the probability relating to the appearance of the dynamic images; assigning means for assigning the order of arrangement for N dynamic images based on said probability; and display control means for conducting control so as to display N dynamic images according to the assigned order.

In addition, the present invention relates to a display control method for conducting control so as to display a demo screen including a character. The method comprises the following steps of: setting in advance a correspondence between each of M dynamic images corresponding to mutually different motions of the character and serving as portions of the demo screen and the probability relating to the appearance of the dynamic images; assigning an order for arranging N dynamic images based on said probability; and displaying N dynamic images according to the assigned order.

In accordance with the inventions described in the above, an order in which N dynamic images are arranged is assigned based on the probability corresponding to each of M dynamic images (motion images) displaying the motions of the character and serving as a portion of the demo screen. As a result, the character can be represented more realistically and the screen is made more enjoyable for the user.

In the aforementioned display control programs, the assignment of order can be conducted by assuming that M is no less than N (i.e., M is equal to or greater than N), specifying, based on said probability, a dynamic image that appears in the K-th order among (M−K+1) dynamic images, which exclude the dynamic images for which the order of appearance has already been specified, and successively repeating such specification, while increasing K from 1 to N. With the aforementioned feature, N dynamic images are arranged without overlapping therefore, a more natural motion can be displayed on the demo screen.

Furthermore, in such display control programs, the demo screen is displayed prior to each of video games simulating a plurality of games and the above-mentioned correspondence can be set so as to differ between the games. With the aforementioned feature, the aforesaid correspondence differs depending on a game. Therefore, motions of the character can be characterized according to the game on the demo screen.

Furthermore, any of a plurality of characters can be specified according to the user's input and the correspondence can be set so as to differ between the characters. With the aforementioned feature, the aforesaid correspondence differs depending on the character. Therefore, the character can be endowed with individual features on the demo screen.

This application is based on Japanese patent application serial no. 2000-336595 filed in Japanese Patent Office on Nov. 2, 2000, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A computer-readable recording medium storing a display control program which controls a demo screen including a character, said display control program comprising the steps of:

setting a correspondence between each of M dynamic images, corresponding to mutually different motions of the character and serving as portions of the demo screen, and a probability relating a chance of appearance of the dynamic images;

assigning an order for arrangement of N dynamic images based on said probability; and displaying said N dynamic images according to the assigned order;

wherein said order assignment is conducted by setting that M is no less than N, specifying, based on said probability, a dynamic image that appears in the K-th order among (M−K+1) dynamic images, which exclude the dynamic images for which the order of appearance has already been specified, and successively repeating said specifying step, while increasing K from 1 to N.

2. The computer-readable recording medium according to claim 1, wherein said demo screen is displayed prior to each of video games simulating a plurality of types of sport games and said correspondence is set so as to be different for each of said plurality of types of sport games.

3. The computer-readable recording medium according to claim 2, wherein any of a plurality of types of characters is specified according to the user's input and said correspondence is set so as to be different for each of said plurality of types of characters.

4. The computer-readable recording medium according to claim 1, wherein any of a plurality of types of characters is specified according to the user's input and said correspondence is set so as to be different for each of said plurality of types of characters.

5. A display method for displaying an object on a display, the method comprising the steps of:

storing motion image data for generating M types of motions of the object on the display;

storing probabilities which relate a chance of appearance of each of said M types of motions;

assigning an order for arrangement of N number of said M types of motions based on said probabilities; and displaying said N number of said M types of motions according to the order for arrangement by using said motion image data to generate said N number of said M types of motions according to the order for arrangement, wherein, M is equal to or greater than N, assigning the order for arrangement is done successively for K positions where K increments from 1 to N, and a K-th order one of said N number of said M types of motions is determined based on said probabilities of said M types of motions excluding ones of said M types of motions whose order is previously determined.

6. The method of claim 5 wherein:

the object is displayed moving in a plurality of contexts;

the probabilities are stored in sets corresponding to ones the plurality of contexts; and the probabilities differ from set to set.

7. The method of claim 6 wherein the plurality of contexts correspond to a plurality of computer games to be executed.

8. The method of claim 7 wherein:

the object is selected from a plurality of objects;

the probabilities are stored in sets corresponding to ones the plurality of plurality of objects; and the probabilities differ from set to set of the objects.

9. The method of claim 8 wherein the plurality of objects correspond to a plurality of characters in the computer games to be executed.

10. The method of claim 5 wherein:

the object is selected from a plurality of objects;

the probabilities are stored in sets corresponding to ones the plurality of plurality of objects; and the probabilities differ from set to set of the objects.

11. The method of claim 10 wherein the plurality of objects correspond to a plurality of characters in the computer games to be executed.

* * * * *